(12) United States Patent
Brenner et al.

(10) Patent No.: US 10,017,139 B2
(45) Date of Patent: Jul. 10, 2018

(54) PORTABLE VEHICLE SETTINGS

(71) Applicant: Google LLC, Mountain View, CA (US)

(72) Inventors: Andrew Scott Brenner, Sunnyvale, CA (US); Joseph M. Onorato, Cambridge, MA (US); Daniel Holle, San Francisco, CA (US); Patrick Brady, San Francisco, CA (US)

(73) Assignee: Google LLC, Mountain View, CA (US)

( * ) Notice: Subject to any disclaimer, the term of this patent is extended or adjusted under 35 U.S.C. 154(b) by 132 days.

(21) Appl. No.: 15/042,589

(22) Filed: Feb. 12, 2016

(65) Prior Publication Data
US 2017/0232914 A1 Aug. 17, 2017

(51) Int. Cl.
*B60R 16/037* (2006.01)

(52) U.S. Cl.
CPC .................. *B60R 16/037* (2013.01)

(58) Field of Classification Search
CPC .............. B60R 16/037; G07C 9/00571; G07C 2209/64
See application file for complete search history.

(56) References Cited

U.S. PATENT DOCUMENTS

| | | | |
|---|---|---|---|
| 6,663,010 B2 | 12/2003 | Chene et al. | |
| 8,634,822 B2 | 1/2014 | Silver et al. | |
| 8,751,065 B1 | 6/2014 | Kato | |
| 9,085,269 B2 | 7/2015 | Abuelsaad et al. | |
| 9,104,537 B1 | 8/2015 | Penilla et al. | |
| 2003/0204296 A1 | 10/2003 | Galli et al. | |
| 2013/0030645 A1 | 1/2013 | Divine et al. | |
| 2013/0151035 A1 | 6/2013 | Park et al. | |
| 2014/0052345 A1 | 2/2014 | Tobin | |
| 2014/0310277 A1 | 10/2014 | Ricci et al. | |
| 2015/0030998 A1 | 1/2015 | Liu et al. | |
| 2015/0045988 A1 | 2/2015 | Gusikhin et al. | |
| 2015/0046060 A1 | 2/2015 | Nikovski et al. | |
| 2015/0149042 A1 | 5/2015 | Cooper et al. | |

FOREIGN PATENT DOCUMENTS

| | | |
|---|---|---|
| CN | 104066629 | 9/2014 |
| DE | 202013010569 | 2/2015 |
| WO | 2001/83257 | 11/2001 |
| WO | 2013/101054 | 7/2013 |
| WO | 2014/091654 | 6/2014 |
| WO | 2014/120248 | 8/2014 |

OTHER PUBLICATIONS

International Search Report and Written Opinion in International Application No. PCT/US2017/016510, dated May 2, 2017, 14 pages.

(Continued)

*Primary Examiner* — Mussa A Shaawat
(74) *Attorney, Agent, or Firm* — Fish & Richardson P.C.

(57) ABSTRACT

A driver may provide preferred vehicle setting data to a system through a user interface or the system may detect the preferred driver vehicle setting data by communicating with a particular vehicle. The preferred vehicle setting data may be generalized/abstracted so that the data is not specific to any one vehicle. When the driver sits in any vehicle, the system may identify the type of vehicle and translate the abstracted driver vehicle setting data to driver vehicle setting data that is particular to the identified vehicle.

20 Claims, 6 Drawing Sheets

(56) References Cited

OTHER PUBLICATIONS

Summers, "Meet Silvercar, The Startup Trying to Shake Up Airport Car Rental," BuzzFeed News, Feb. 25, 2015 [retrieved on Feb. 10, 2016]. Retrieved from the Internet: URL<http://www.buzzfeed.com/mariahsummers/meet-silvercar-the-startup-trying-to-shake-up-airport-car-re#.cuW5zjZy3>, 12 pages.

International Preliminary Report on Patentability issued in International Application No. PCT/US2017/016510, completed on Jan. 24, 2018, 6 pages.

PORTABLE VEHICLE SETTINGS

FIELD

This disclosure generally relates to connected vehicles.

BACKGROUND

Vehicle setting values may be adjusted for a driver when the driver enters the vehicle. For example, a driver may adjust a value of a car seat setting or a value of an ambient temperature setting in a vehicle. Accordingly, each driver that enters a vehicle often has to take time to change the vehicle setting values leading to driver inconvenience and inefficient use of time.

SUMMARY

This disclosure generally describes a system and method for obtaining driver vehicle setting data and applying the obtained driver vehicle setting data to one or more vehicles.

According to implementations, a driver's profile may be stored in the driver's device or a cloud-based database. The driver's profile may include abstracted vehicle setting data that is not particular to any vehicle. Based on receiving an indication that a driver is scheduled to or is about to enter a vehicle, the abstracted vehicle setting data may be converted into driver vehicle setting values particular to the driver and the vehicle being approached or entered. The converted driver vehicle setting values are transmitted to a vehicle control module of the vehicle which applies the converted driver vehicle setting values in the vehicle. In this manner, the driver does not have to adjust vehicle setting values each time the driver enters a vehicle. Instead, vehicle driver setting values are adjusted based on the driver profile stored in the driver's user device or the cloud-based database without requiring the driver to manually adjust vehicle setting values. Furthermore, the abstracted vehicle setting data may be used and applied for various vehicles the driver may enter or be scheduled to drive.

Innovative aspects of the subject matter described in this specification include, in some implementations, a computer-implemented method to perform actions. The actions include identifying a vehicle associated with a particular driver, obtaining vehicle setting data associated with the identified vehicle and the particular driver, determining abstract driver vehicle setting data that is not particular to the identified vehicle based on the obtained vehicle setting data associated with the identified vehicle and the particular driver, and storing the abstract driver vehicle setting data in a database.

Implementations may each optionally include one or more of the following features. For instance, in some implementations, the obtained vehicle settings include one or more of mirror positions, a driver seat position, steering wheel position, foot pedal positions, radio station presets, heating, ventilation, air conditioning (HVAC) settings, vehicle lighting preferences, wiper speed settings, navigation settings, camera bumper settings, safety alert settings, child lock settings, and window lock settings.

In some implementations, the action of identifying the vehicle associated with the particular driver includes one of: (i) receiving, from the particular driver, an input indicating an identification of the vehicle, and (ii) receiving, from a vehicle control module of the vehicle, an identification of the vehicle.

In some implementations, the action of determining the abstract driver vehicle setting data that is not particular to the identified vehicle based on the obtained vehicle setting data associated with the particular driver and the identified vehicle includes determining a likely profile of the particular driver. The likely profile of the particular driver includes data indicating at least a likely height, a likely arm length, and a likely leg length of the particular driver.

In some implementations, the action of determining the abstract driver vehicle setting data that is not particular to the identified vehicle based on the obtained vehicle setting data associated with the particular driver and the identified vehicle further includes generating the abstract driver vehicle setting data based on the likely profile of the particular driver.

In some implementations, the action of storing the abstract driver vehicle setting data in the database includes storing one or more of the abstract driver vehicle setting data, an identification of the vehicle, and the likely profile of the particular driver in an Internet cloud database associated with the particular driver or in a server remote from the vehicle.

In some implementations, the action of obtaining the vehicle setting data associated with the identified vehicle and the particular driver includes one or more of: (i) obtaining the vehicle setting data from the particular driver including actions of displaying a graphical user interface, and receiving, though the graphical user interface, one or more selections indicative of the vehicle setting values selected by the particular driver; and (ii) obtaining the vehicle setting data from a vehicle control module of the vehicle.

Innovative aspects of the subject matter described in this specification also include, in some implementations, a computer-implemented method that performs actions including receiving driver identification data identifying a particular driver, obtaining abstract driver vehicle setting data based on the driver identification data, receiving vehicle identification data identifying a vehicle, determining, by one or more processors, driver vehicle setting data particular to the vehicle based on the abstract driver vehicle setting data, and applying, to the vehicle, the driver vehicle setting data particular to the vehicle.

Implementations may each optionally include one or more of the following features. For instance, in some implementations, the actions may also include determining that the received driver identification data corresponds to a driver identification of the particular driver stored in an Internet cloud database associated with the particular driver. The action of obtaining the abstract driver vehicle setting data based on the driver identification data includes obtaining the abstract driver vehicle setting data from the Internet cloud database associated with the particular driver.

In some implementations, the action of receiving the vehicle identification data identifying the vehicle includes one of (i) obtaining the vehicle identification data received by a portable electronic device from the particular driver identified by the driver identification data, and (ii) obtaining the vehicle identification data received by the portable electronic device from the vehicle.

In some implementations, the action of determining driver vehicle setting data particular to the vehicle based on the abstract driver vehicle setting data includes obtaining a likely profile of the particular driver from the abstract driver vehicle setting data, and determining the driver vehicle setting data particular to the vehicle identified by the vehicle identification data based on the likely profile of the particular driver. The likely profile of the particular driver includes data that indicates at least a likely height, a likely arm length, and a likely leg length of the particular driver.

In some implementations, the action of applying, to the vehicle, the driver vehicle setting data particular to the vehicle includes transmitting, to the vehicle, the driver vehicle setting data particular to the vehicle. The driver vehicle setting data particular to the vehicle is applied by the vehicle to configure settings in the vehicle to the driver vehicle setting data.

Innovative aspects of the subject matter described in this specification also include, in some implementations, a computer-implemented method that performs actions including identifying a vehicle associated with a particular driver, obtaining vehicle setting data associated with the identified vehicle and the particular driver, determining, by one or more processors, abstract driver vehicle setting data that is not particular to the identified vehicle based on the obtained vehicle setting data associated with the particular driver and the identified vehicle, and storing the abstract driver vehicle setting data in a database. The actions also include receiving an indication of a presence of a second vehicle, transmitting driver identification data identifying the particular driver, obtaining, using the database, the abstract driver vehicle setting data based on the driver identification data, determining, by the one or more processors, driver vehicle setting data particular to the second vehicle based on the abstract driver vehicle setting data, and applying, to the second vehicle, the driver vehicle setting data particular to the second vehicle.

Implementations may each optionally include one or more of the following features. For instance, in some implementations, the action of receiving the indication of the presence of the second vehicle includes performing active scanning or passive scanning to detect the presence of the second vehicle.

In some implementations, the actions of receiving the indication of the presence of the second vehicle includes receiving an input from the particular driver indicating the presence of the second vehicle. The input from the particular driver includes vehicle identification data identifying the second vehicle.

Other implementations of these aspects include corresponding systems, apparatus, computer-readable storage mediums, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

This disclosure generally describes methods and systems for obtaining driver vehicle setting values and applying the obtained driver vehicle setting values to one or more vehicles.

Figure 1:
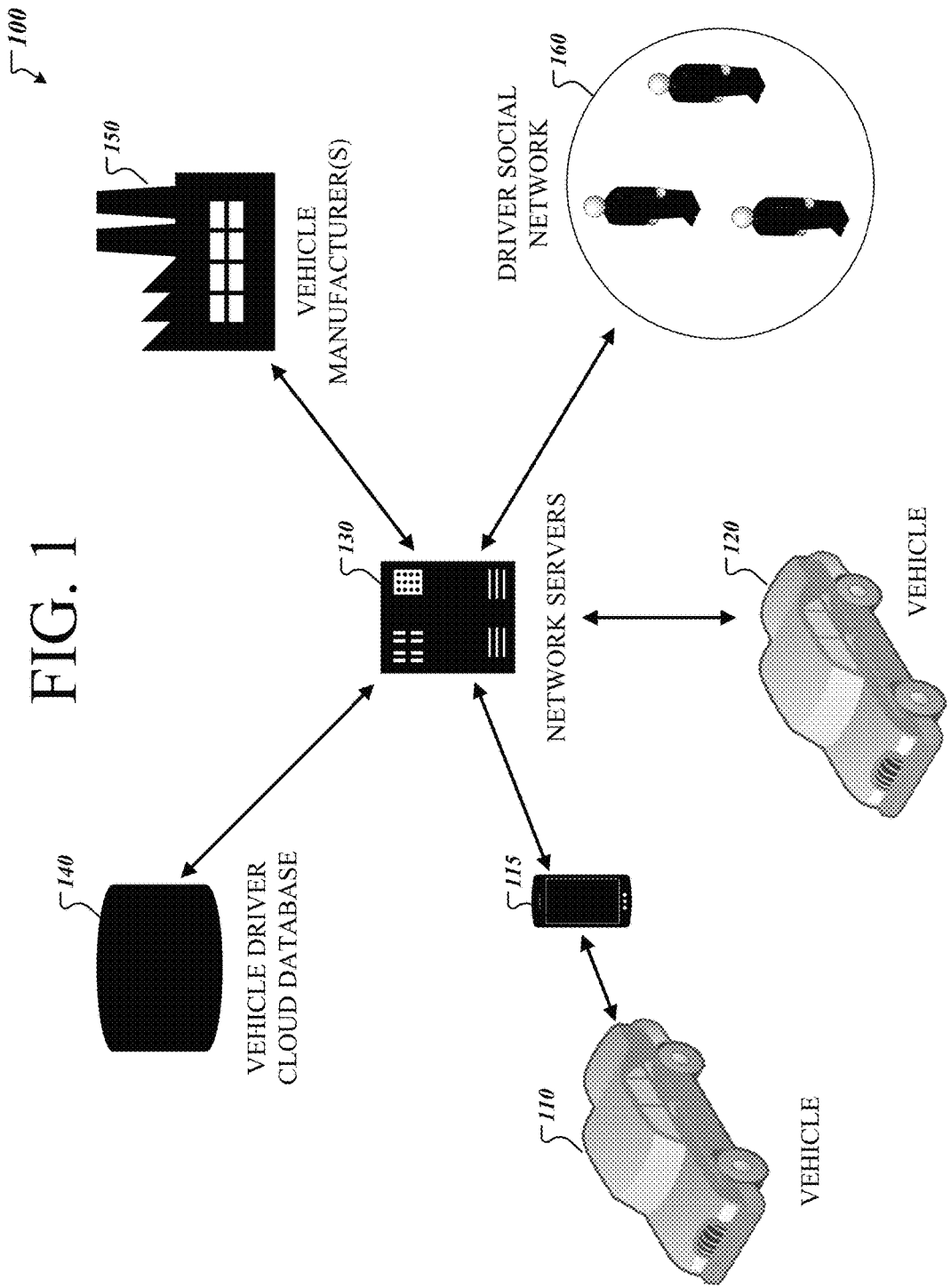
FIG. 1 depicts a portable vehicle settings data sharing system.

FIG. 1 depicts a portable vehicle settings data sharing system 100 that includes vehicle 110, user device 115, vehicle 120, one or more network servers 130, a vehicle driver cloud database 140, one or more vehicle manufacturers 150, and a driver social network 160. It should be understood that although two vehicles 110, 120 are shown in system 100, any suitable number of vehicles may be present in the system 100 at any time.

System 100 may include one or more networks that are configured to provide network access, data transport, and other services to any interface connected to the one or more networks. In general, the one or more networks may include and implement commonly-defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include access points, storage systems, cloud systems, modules, one or more databases including vehicle driver cloud database 140, and servers including one or more network servers 130. The one or more network servers 130 may include any suitable computing device coupled to the one or more networks, including but not limited to a personal computer, a server computer, a series of server computers, a mini computer, and a mainframe computer, or combinations thereof. The one or more network servers 130 may also include a web server, or a series of servers, running a network operating system, examples of which may include but are not limited to Microsoft® Windows® Server, Novell® NetWare®, or Linux®. The one or more network servers 130 may be used for and/or provide cloud and/or network computing. Although not shown in the figures, the server may have connections to external systems providing messaging functionality such as e-mail, SMS messaging, text messaging, and other functionalities, such as advertising services, search services, etc.

In some implementations, the one or more networks may include a cloud system that may provide Internet connectivity and other network-related functions. For example, the cloud system may provide storage services for at least a portion of the data transmitted between components of system 100.

System 100 also includes a vehicle driver cloud database 140, which may include a cloud database or a database managed by a database management system (DBMS). A DBMS may be implemented as an engine that controls organization, storage, management, and retrieval of data in a database. DBMSs frequently provide the ability to query, backup and replicate data, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

In some implementations, the vehicle driver cloud database 140 may store vehicle setting data that may be specific to a particular driver, specific to a particular vehicle, or may be abstract vehicle setting values associated with a profile of a particular driver. The vehicle driver cloud database 140 may maintain vehicle setting data categorized by driver or by vehicle make and model.

Vehicle settings may include mirror positions, seat position, steering wheel position, foot pedal positions, radio station presets, heating, ventilation, air conditioning (HVAC) settings, lighting preferences, e.g., fog lights on or off, internal light settings, wiper speed settings, navigation settings, camera bumper settings, safety alert settings, e.g., low fuel alerts, blind spot alerts, child lock settings, and window lock settings. In general, the vehicle settings may include any driver or passenger-configurable option or setting in a vehicle.

Vehicle settings specific to a vehicle may have a range of values and corresponding limits for a particular vehicle setting. For example, the vehicle driver cloud database 140 may store a first range of positions that a driver seat position can be adjusted in one vehicle and a second range of positions that a driver seat position can be adjusted in another vehicle. Accordingly, the vehicle driver cloud database 140 may maintain a record of different vehicles, and for each vehicle, the vehicle options, specifications, and the range of particular settings within the vehicle. It should also be appreciated that different vehicles may have different settings and operation modes. For example, one vehicle may be configured to operate in a sports mode and may have vehicle setting values applicable or selected for the sports mode. Another vehicle may be configured to operate in a highway mode and may have vehicle setting values applicable or selected for the highway mode.

In some implementations, the vehicle driver cloud database 140 may store driver identification data that includes, for example, one or more of a user name or identification, password, driver's license data, or biometric data of the driver. The vehicle driver cloud database 140 may also store information associated with vehicles the driver has previously driven and vehicle setting values the driver utilized in the respective vehicles. For example, the vehicle driver cloud database 140 may store a first foot pedal position that the driver used in a one car and a second foot pedal position that the driver used in another vehicle. The first foot pedal and the second foot pedal position may be the same in some cases and different in other cases.

In some implementations, the vehicle driver cloud database 140 may maintain a driver profile and store the driver identification data and the information associated with vehicles the driver has previously driven in the driver profile. The driver profile may also include vehicle setting data that has been abstracted and is associated with the driver.

In some implementations, the driver profile may include a physical profile of the driver, which includes data indicating various relevant physical characteristics of the driver such as, for example, height, arm length, and leg length. The various physical characteristics of the driver can be estimated based on average vehicular setting values used by a driver or, in some cases, vehicular settings for a car most frequently driven by the driver. For example, if a driver generally sets the driver car seat position at a position close to the steering wheel in multiple cars or in a car the driver most frequently drives, the likely height of the driver may be determined to be, for example, less than 5'6". In another example, if a driver generally sets the driver car seat position at a maximum distance away from the steering wheel in multiple cars, the likely height of the driver may be determined to be, for example, at least 6'.

Various different and suitable methodologies may be used to determine the likely physical characteristics of a driver. For example, in some implementations, a reference table may be used to determine a corresponding driver height from a seat position or distance from the steering wheel of a particular vehicle. In some implementations, a driver may be requested through the vehicle navigation system or the driver's portable electronic device to provide information on the driver's physical characteristics. In some implementations, an alignment or orientation of mirrors may be used to determine the likely location of a driver's head and a likely height of the driver.

In addition to the likely physical characteristics of a driver, the driver profile may also include data indicative of the personal preferences. For example, data indicating the ambient temperature within a car, radio station presets, lighting settings, safety alert settings, child lock settings, or window lock settings preferred by the driver may be stored in the driver profile.

Further to the descriptions above, a user may be provided with controls allowing the user to make an election as to both if and when systems, programs or features described herein may enable collection of user information (e.g., physical characteristics, information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Each of vehicle 110 and vehicle 120 may be one of an automobile, rickshaw, moped, motor cycle, bicycle, snowmobile, truck, Segway, etc. Vehicle 110 and vehicle 120 may each correspond to one of various suitable makes and models including, for example, a Honda Civic, Honda Accord, Toyota Camry, Volkswagen Beetle, Mercedes Benz CLK, BMW 5 series, Chevrolet Corvette, etc. In some implementations, vehicle 110 and vehicle 120 may each include a vehicle control module to control one or more operations of vehicle 110 and vehicle 120, respectively.

As described in further detail below, the vehicle control module is configured to communicate directly or indirectly through system 100 to communicate with other system 100 elements such as the one or more network servers 130, user device 115, vehicle cloud driver database 140, other vehicles, one or more vehicle manufacturers 150, and the driver social network 160. For example, the vehicle control module may communicate with user device 115 to obtain information about a driver carrying the user device 115 or to send information about the vehicle.

In some implementations, the vehicle control module may also be connected to various components and sensors of the vehicle to implement commands and operations or to determine a status of the components and sensors in the vehicle. Accordingly, the vehicle control module may provide status information about a component or sensor in the vehicle to system 100 elements such as the one or more network servers 130 or the user device 115. For example, the vehicle control module can provide a notification if a door is not locked or information indicating the ambient temperature in the vehicle based on data received from components and sensors in the vehicle.

The user device 115 may be any suitable portable electronic device. Examples of a portable electronic device include, but are not limited to, a computer, lap top, personal digital assistant, electronic pad, electronic notebook, telephone, smart phone, television, smart television, a watch, smart glasses, or any electronic device that is connected to a network and has a display. The user device 115 may be any combination of hardware and software and may execute any suitable operating system such as an Android® operating system.

The user device 115 may be used by a driver of vehicle 110. The user device 115 may include an application that allows the user device 115 to communicate with vehicle 110 and one or more network servers 130. For example, in some cases, an application on the user device 115 may control the user device 115 to communicate with a vehicle control module in vehicle 110 and to obtain driver vehicle setting values used by a driver who is in possession of the user device 115 and is driving or has driven vehicle 110. The obtained driver vehicle setting values or data may be transmitted to network servers 130 and subsequently stored in vehicle driver cloud database 140. In some cases, the user device 115 may transmit driver vehicle setting data to a vehicle upon detecting that the vehicle is within a threshold distance of the driver who is possession of the user device 115. The threshold distance may be set by an application developer, user device or vehicle manufacturer, or the driver to any suitable distance, for example, 1 meter (m), 3 m.

The one or more network servers 130 may also be configured to communicate with one or more vehicle manufacturers 150 and one or more social networks 160 associated with the driver. The vehicle manufacturers 150 may include any vehicle manufacturer such as Toyota, Honda, Mercedes-Benz, etc. The social networks 160 may include any suitable network such as Facebook, Twitter, Instagram, and may also include social network websites and blogs. The social networks 160 may include friends, family, or followers of a driver.

Figure 2A:
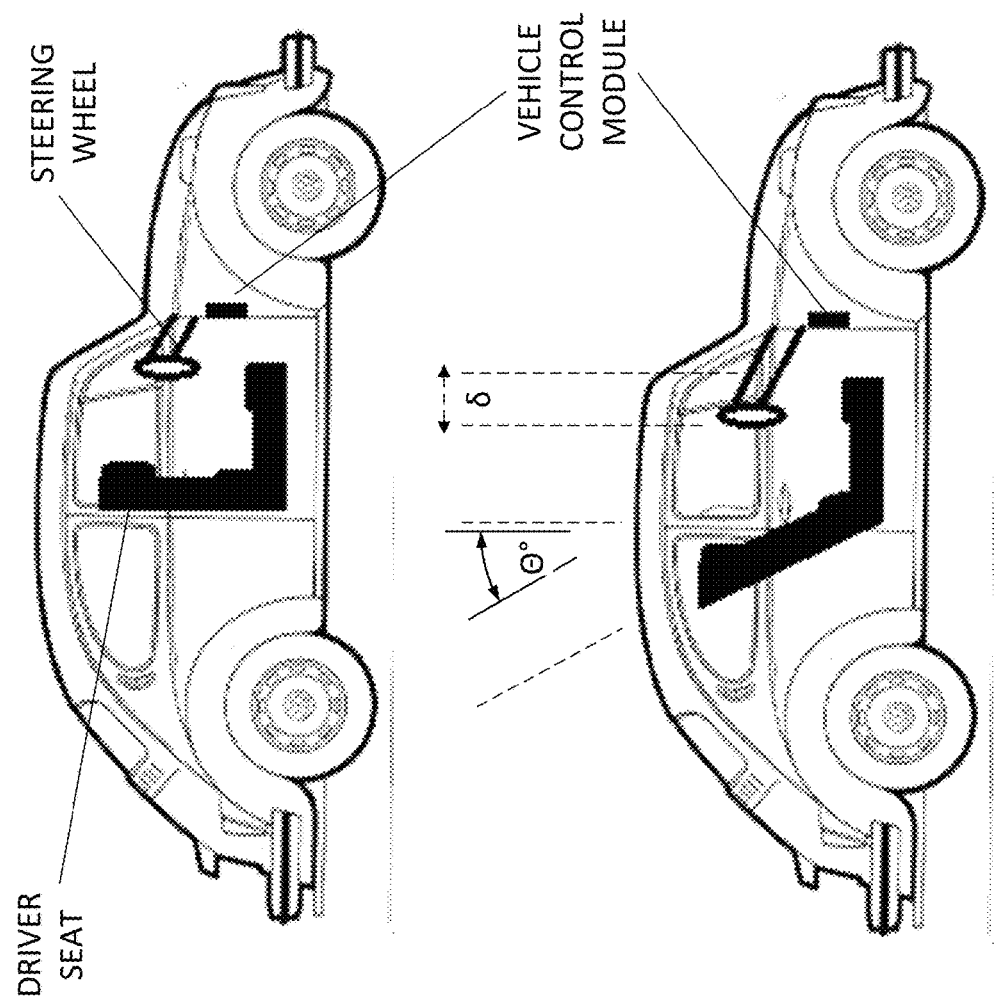
FIGS. 2A and 2B depict an exemplary scenario in which a vehicle setting is modified to accommodate a driver.

Exemplary implementations are described with respect to FIGS. 2A-6. FIG. 2A illustrates a vehicle including a vehicle control module. The vehicle control module may be connected to various components and parts of the vehicle, such as the steering wheel and the driver's seat wirelessly or through a wireline connection. As shown in FIG. 2A, the steering wheel and driver's seat may be in one position when no driver is in or around the vehicle.

Figure 2B:
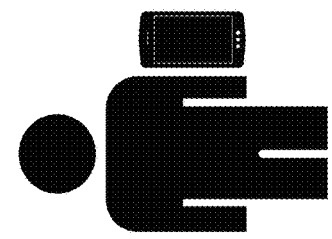

As shown in FIG. 2B, when a driver and the driver's user device 115 are determined or scheduled to be approaching the vehicle, various components and parts of the vehicle, such as the steering wheel and the driver's seat, may be reset or adjusted to new positions that are specific to the driver. For example, the steering wheel may shift by $\delta$ towards the driver and the driver's seat may be inclined at an angle $\theta°$ relative to the previous positions of the steering wheel and driver's seat shown in FIG. 2A. Although FIGS. 2A and 2B illustrate changes in the steering wheel position and driver's seat inclination, various other vehicle settings such as mirror positions, foot pedal positions, radio station presets, heating, ventilation, air conditioning (HVAC) settings, lighting preferences, for example, fog lights on or off and internal light settings, wiper speed settings, navigation settings, camera bumper settings, safety alert settings, for example, low fuel alerts or blind spot alerts, child lock settings, and window lock settings may also be adjusted. An explanation as to how the vehicle settings are adjusted is provided with reference to FIGS. 4-6.

As a preliminary matter, a driver or user may elect to download a portable vehicle settings application onto user device 115. The portable vehicle settings application is configured to display a graphical user interface on the user device 115 to receive information from or present information to the driver. The portable vehicle settings application may also be configured to communicate with vehicle control modules of a plurality of vehicles.

After downloading the portable vehicle settings application, in some implementations, the driver may provide information regarding one or more vehicles that the driver most frequently uses. This information may include one or more of a make and model of the vehicle, a vehicle identification number, a registration of the vehicle, and preferred vehicle setting values of the driver in the one or more vehicles, respectively. The information regarding one or more vehicles may be stored in the user device 115 or a driver profile in the vehicle driver cloud database 140. In some implementations, the driver may not provide any information regarding a vehicle after downloading the portable vehicle settings application, but the user device 115 may communicate with one or more vehicle control modules in the one or more vehicles, respectively, to obtain information regarding the one or more vehicles, respectively.

Based on the obtained information regarding a vehicle, the vehicle may be identified (410). For example, in some implementations, a user may submit an input identifying a vehicle through a graphical user interface of the portable vehicle settings application. In some implementations, a user device 115 may communicate with a vehicle control module to identify a vehicle profile, for example, the make and model of the vehicle, in which the vehicle control module is located. When the user device 115 identifies a vehicle profile of a vehicle by communicating with a vehicle control module, in some cases, the user device 115 may also display the identified vehicle profile for the driver and request the driver to confirm the identification of the vehicle.

The user device 115 may communicate with the vehicle control module through various suitable means. For example, the user device 115 may determine that a vehicle control module is within a threshold distance and may communicate through a short distance network such as a Bluetooth network, a ZigBee network, an infrared network, or medium to long distance networks such as a GSM network, a GPRS network, UMTS network, LTE network, a LAN, a WAN, or a VLAN using various suitable packet transmission and messaging methods such as SMS messaging and text messaging.

The user device 115 may determine that the user device 115 is scheduled to be or is physically within a threshold distance of a vehicle using any suitable method. For example, in some implementations, the user device 115 may receive an input from a driver that the driver is approaching a vehicle. In some implementations, the user device 115 may perform active or passive scanning to detect the presence of a vehicle within a threshold distance of the user device 115. In some implementations, the user device 115 may transmit a beacon signal and receive a response from a vehicle control module of a vehicle in response to the beacon signal. In some implementations, the user device 115 may obtain information from the driver or driver's calendar or personal messages indicating that the driver is scheduled to rent or drive a particular car at a scheduled time.

After identifying the vehicle, the driver's vehicle setting data is obtained (420). In some implementations, the driver's vehicle setting data may be obtained from the driver through a graphical user interface of the portable vehicle settings application. For example, the driver may indicate a preferred ambient temperature or driver seat position of a vehicle the driver is about to enter, has entered, or is within a threshold distance of, using the graphical user interface of the portable vehicle settings application.

In some implementations, the user device 115 may obtain the driver vehicle setting data from a vehicle control module of a vehicle in which the driver is sitting in. For example, the user device 115 may request the vehicle control module for data indicative of one or more driver vehicle setting values in the vehicle the driver is sitting in. In response, the vehicle control module may send the requested data to the user device 115.

The received driver vehicle setting data that is particular to the driver and vehicle are transformed to abstracted driver vehicle setting data (430). In some implementations, the received driver vehicle setting data is transformed to abstracted driver vehicle setting data that is not particular to the vehicle by determining a likely physical profile of the driver as described hereinabove.

In some implementations, the transformation of the received driver vehicle setting data to the abstracted driver vehicle setting data may be performed at the user device 115. In some implementations, the transformation of the received driver vehicle setting data to the abstracted driver vehicle setting data may be performed in the cloud, for example, in at a network server 130.

The abstracted driver vehicle setting data may be stored in one or more of the cloud or the user device 115 (440). In some implementations, the abstracted driver vehicle setting data is stored in a profile associated with the driver in the cloud. After the portable vehicle settings data sharing system 100 has stored abstracted driver vehicle setting data for a driver, the abstracted driver vehicle setting data may be applied to any car the driver sits in or approaches within a threshold distance.

Figure 5:
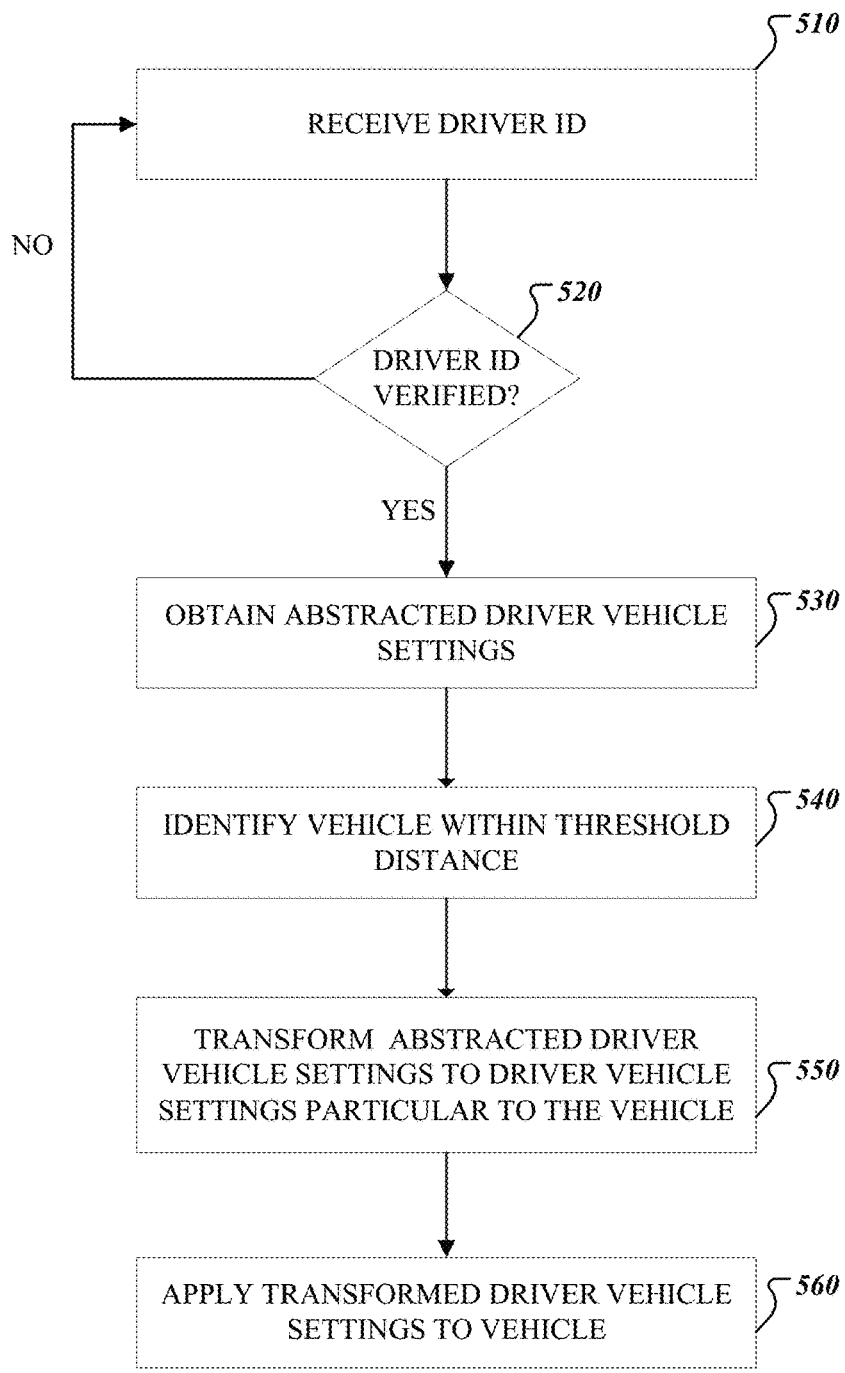
FIG. 5 depicts a flowchart illustrating a method for applying driver vehicle setting values.

For instance, referring to FIG. 5, when a user device 115 determines that a vehicle is within a threshold distance of the user device 115 or that the driver is scheduled to be within a threshold distance of a vehicle at a current time, the user device 115 may prompt a driver in possession of the user device 115 to enter a driver identification (ID) through a GUI of the portable vehicle settings application installed on the user device 115 so that the user device 115 may receive the driver ID (510).

The user device 115 may determine that a vehicle is within a threshold distance of the user device 115 using any suitable method as described above. In some implementations, the threshold distance may be 1 m, 3 m, or a distance indicating that the driver is sitting within a vehicle.

The driver ID may be received by the user device 115 through various suitable means. For example, in some implementations, the driver may enter a driver ID using an alphanumeric keyboard on the user device 115. In some implementations, the driver may scan a driver's license of the driver. In some implementations, the driver may submit any biometric indicator, for example, a finger print or iris scan, associated with the driver.

After receiving the driver ID, a verification of the driver ID is performed to determine if the driver ID is valid (520). In some implementations, the received driver ID is sent to a secure server, which compares the received driver ID to driver IDs stored in a verified and secure identification database. If the comparison of the received driver ID and the driver IDs stored in the secure identification database satisfies a certain threshold, the received driver ID is verified as valid. If the comparison of received driver ID and the driver IDs stored in the secure identification database does not satisfy a certain threshold, the received driver ID is determined not to be valid.

In some implementations, the user device 115 or the vehicle driver cloud database 104 may have stored the driver ID and the driver ID may not have to be entered or verified.

In implementations in which the drive ID is verified and the received driver ID is determined not to be valid, the user device 115 may prompt the driver to input a driver ID again (510). If the received driver ID is determined to be valid, abstracted driver vehicle setting data associated with the valid driver ID are obtained (530). For example, in some implementations, abstracted driver vehicle setting data included in a driver profile stored on the user device 115 or in the vehicle driver cloud database 140 are retrieved.

Next, the user device 115 may identify the vehicle that is within the threshold distance of the user device 115 (540). For instance, referring to FIGS. 2B-3A, the user device 115 may identify that a Volkswagen Beetle is within a threshold distance of the user device 115. In another example, in FIG. 3B, the user device 115 may identify that a Chevrolet Corvette is within a threshold distance of the user device 115. As noted above, in some implementations, the user device 115 may display a vehicle profile of an identified vehicle for the driver and request the driver to confirm the vehicle identification.

After identifying the vehicle within a threshold distance of the user device 115, the abstracted driver vehicle setting data is transformed to driver vehicle setting data that is particular to the driver and the identified vehicle (550).

To transform the abstracted driver vehicle setting data, the user device 110 may determine if the identified vehicle has previously been driven by the driver. If the driver has previously driven the vehicle, the user device 110 may obtain stored historical vehicle setting data of the driver for the identified vehicle to transform the abstract vehicle setting data. For example, a value of a vehicle setting, for example, position of the driver car seat the last time the driver was seated in the car, that has been stored in the vehicle driver cloud database 140 is obtained, and the abstracted driver vehicle setting data may be transformed to be equivalent to the stored value of the vehicle setting.

If the driver has not previously driven the vehicle, vehicle settings data specific to the identified vehicle may be obtained from the vehicle driver cloud database 140. The vehicle settings data specific to the identified vehicle provide a range of values and corresponding limits of one or more vehicle settings specific to the identified vehicle. The abstracted driver vehicle setting data may then be applied to vehicle settings specific to the identified vehicle, in part, based on the driver's likely physical profile.

For example, to transform an abstract setting data of a particular vehicle setting, for example a driver car seat position, a range of values associated with the particular vehicle setting, for example a driver car seat position, in the identified vehicle is determined. If the driver's likely physical profile indicates that the driver has a likely height of less than 5'6", a low value, for example, a short distance of driver car seat from the foot pedals, in the range of values of the particular vehicle setting may be selected. If the driver's likely physical profile indicates that the driver has a likely height of more than 5'11", a higher value, for example, a large distance of driver car seat from the foot pedals, in the range of values of the driver car seat position may be selected. In some implementations, a reference table providing a corresponding relationship or mapping between the driver's likely physical profile and the particular vehicle setting for a particular vehicle may be used to select a value to apply for the particular vehicle setting.

After transforming the abstracted driver vehicle setting data to driver vehicle setting data particular to an identified vehicle, the transformed driver vehicle setting data may be applied to the identified vehicle (560). For example, as shown in FIGS. 2A and 2B, when a driver approaches a vehicle with the driver's user device 115, the car seat position and the steering wheel in the vehicle are adjusted. The car seat inclines away from the steering wheel by an angle θ, and the steering wheel moves away from the dashboard by a distance δ. Although FIGS. 2A and 2B only illustrate changes in the car seat position and steering wheel position, it should be understood that various other vehicle settings may also be adjusted.

Figure 3A:
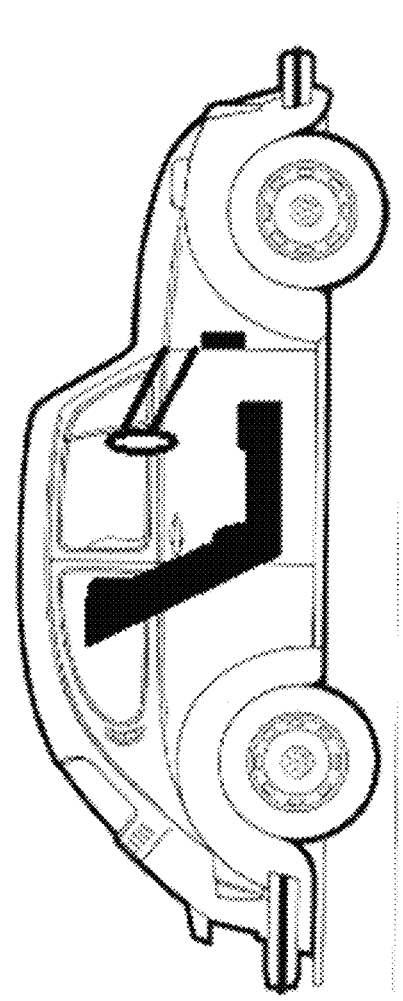
FIGS. 3A and 3B depict an exemplary scenario in which vehicle setting values are modified for different vehicles to accommodate the same driver.
Figure 3A:
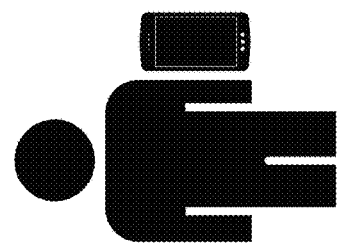
Figure 3B:
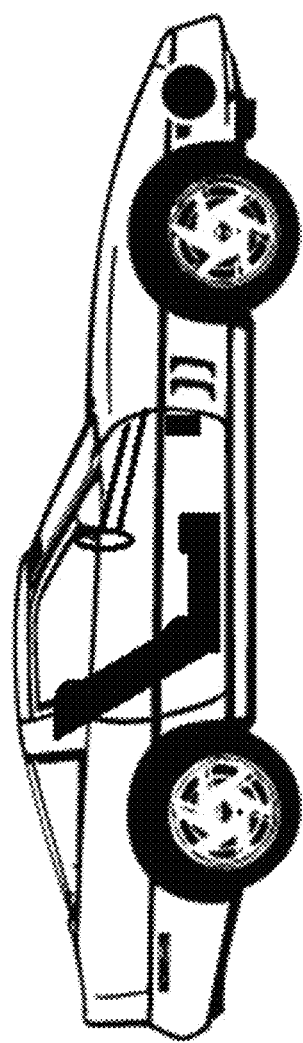
Figure 3B:
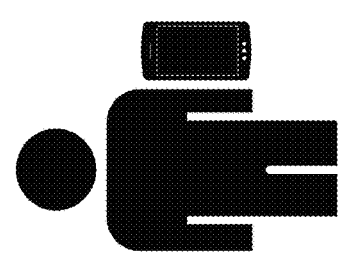
Figure 4:
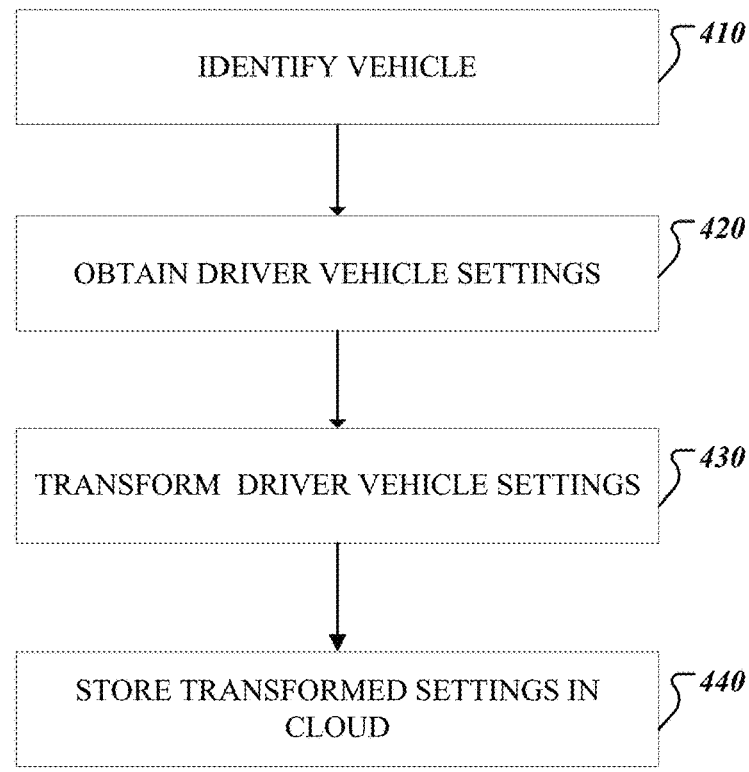
FIG. 4 depicts a flowchart illustrating a method for configuring driver vehicle settings.

In addition, it should be understood that the abstracted driver vehicle setting data may be transformed and applied to various possible vehicles. For example, referring to FIGS. 3A and 3B, the abstracted driver vehicle setting data may be transformed and applied to one type of vehicle, as shown in FIG. 3A, or a second type of vehicle that is different than the first type of vehicle, as shown in FIG. 3B. The adjustments in driver vehicle setting values for both vehicles may, in some cases, be the same, and, in some cases, may be different. For example, the temperature settings may be adjusted to the same temperature in both vehicles. However, because of body type of each car, the mirrors and seats may be adjusted in a different manner for both vehicles.

Figure 6:
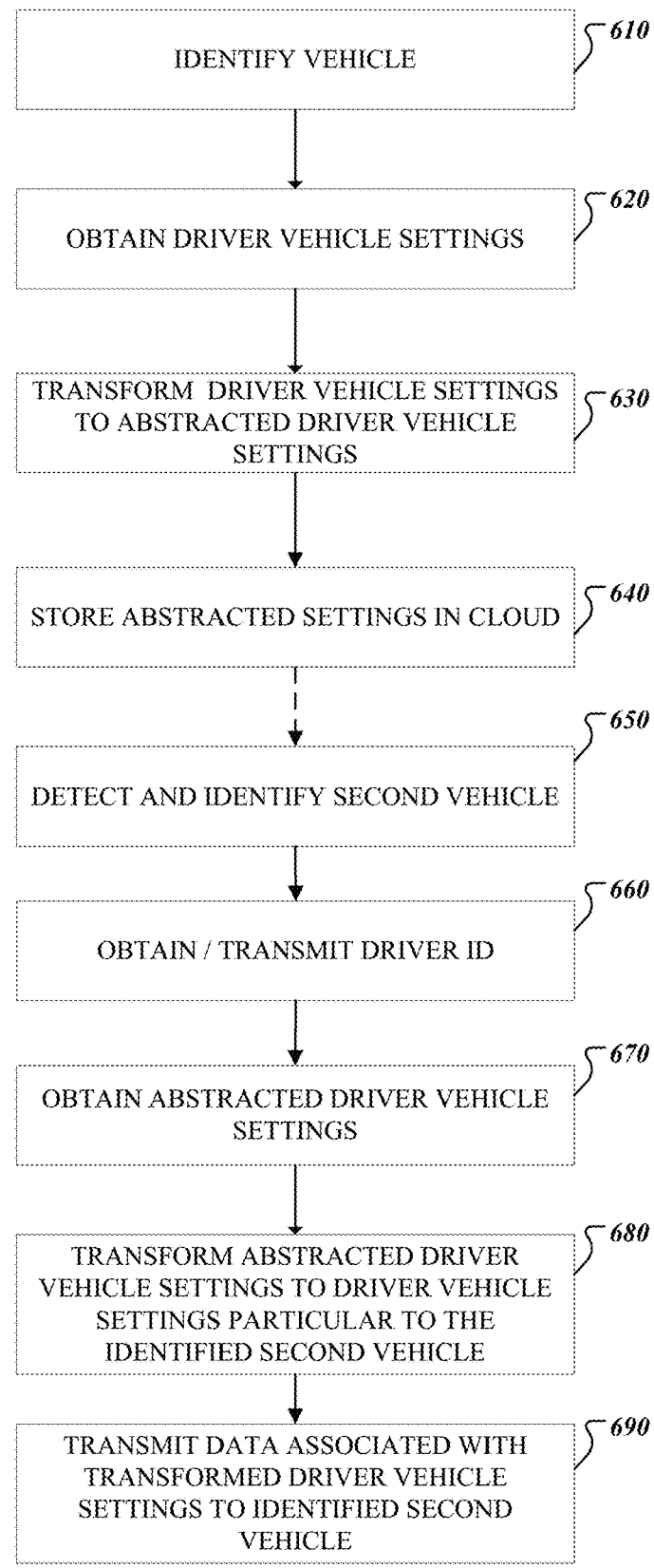
FIG. 6 depicts a flowchart illustrating a method to obtain driver vehicle setting values from one car and apply the driver vehicle data to another car.

FIG. 6 depicts a flowchart illustrating a method to obtain driver vehicle setting data from one car and apply the driver vehicle setting data to another car. Actions 610 to 640 are similar to actions 410 to 440 described above.

After obtaining and storing abstracted driver vehicle setting data, the user device 115 may detect and identify another vehicle (i.e., a second vehicle) different from the first vehicle which is within a threshold distance of the user device (650). In some implementations, the user device 115 may determine that a driver is scheduled to drive, rent, or approach the second vehicle at a current time. As noted above, various suitable methods may be used to detect the presence of a vehicle within the threshold distance, which may be set by an application developer, device or vehicle manufacturer, or the driver to any suitable distance.

After identifying the second vehicle, the user device 115 may obtain an ID of the driver (660). The driver ID may be obtained and verified as explained above with reference to actions 510 and 520. In some implementations, the driver ID may be stored in the user device 115 and the driver ID may be retrieved from a memory of the user device 115.

After obtaining the driver ID, the user device 115 may determine whether the abstracted driver vehicle setting data associated with the driver ID is stored in the user device 115 or in the vehicle driver cloud database 140. If the abstracted driver vehicle setting data associated with the driver ID is stored in the vehicle driver cloud database 140, the user device 115 transmits the driver ID to the vehicle driver cloud database 140 with a request to receive the abstracted driver vehicle setting data associated with the driver ID (660).

In some implementations, in response to transmitting the request to receive the abstracted driver vehicle setting data associated with the driver ID, the user device 115 may then receive or obtain the abstracted driver vehicle setting data associated with the driver ID from the vehicle driver cloud database 140 (670). In some implementations, the user device 115 may retrieve the abstracted driver vehicle setting data associated with the driver ID from the memory of the user device 115 (670).

After obtaining the abstracted driver vehicle setting data, the user device 115 may transform the abstracted driver vehicle setting data to driver vehicle setting data that is associated with the driver ID and particular to the vehicle identified in action 650 (680). The transformation in action 680 is similar to the transformation in action 550.

After transforming the abstracted driver vehicle setting data to driver vehicle setting data that is associated with the driver ID and particular to the vehicle, data associated with the transformed driver vehicle setting data is transmitted to a vehicle control module of the identified second vehicle through any suitable messaging means (690). The vehicle control module of the identified second vehicle may then apply the driver vehicle setting data to the second vehicle.

The application of the driver vehicle setting data to the second vehicle may occur while the driver is approaching the second vehicle and before the driver enters the second vehicle, or after the driver has opened a door of the second vehicle and is getting seated or is already seated in the second vehicle.

Although implementations have been described with respect to a driver and driver vehicle settings, these implementations may apply to a passenger of a vehicle and different sections or seats of a vehicle. For example, using the portable vehicle settings application, a user may be able to configure one set of vehicle settings when the user is a driver and another set of vehicle settings when the user is a passenger. In addition, the user may be able to configure one set of vehicle settings when the user is sitting in the front row of a vehicle and another set of vehicle settings when the user is sitting in, for example, a second or third row of a vehicle.

An advantage of the system and method described hereinabove is that a user or driver is no longer required to manually adjust a vehicle setting value when the user or driver enters a vehicle. Instead, one or more vehicle setting values can be adjusted without requiring manual action by the user or driver using communications between the user or driver's portable electronic device and a vehicle control module in a vehicle the user or driver is approaching or entering. Accordingly, users utilizing ride-sharing services or car rental services may benefit from the reduced inconveniences and greater control of their vehicle-riding experiences.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on one or more computers having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method comprising:
   receiving driver identification data identifying a particular driver;
   obtaining, by one or more processors, abstract driver vehicle setting data based on the driver identification data, wherein the abstract driver vehicle setting data (i) includes vehicle component settings configurable for a plurality of vehicles and (ii) is generated based on the vehicle setting data obtained from a particular vehicle associated with the particular driver;

receiving vehicle identification data identifying a vehicle other than the particular vehicle;

determining, by the one or more processors, driver vehicle setting data particular to the vehicle other than the particular vehicle based on the abstract driver vehicle setting data; and triggering, by the one or more processors, an application of the driver vehicle setting data particular to the vehicle other than the particular vehicle to modify one or more physical settings of one or more vehicle components in the vehicle other than the particular vehicle.

2. The computer-implemented method of claim 1, wherein the driver vehicle setting data particular to the vehicle comprise data indicative of one or more of mirror positions, a driver seat position, steering wheel position, foot pedal positions, radio station presets, heating, ventilation, air conditioning (HVAC) settings, vehicle lighting preferences, wiper speed settings, navigation settings, camera bumper settings, safety alert settings, child lock settings, and window lock settings.

3. The computer-implemented method of claim 1, further comprising:

determining that the received driver identification data corresponds to a driver identification of the particular driver stored in an Internet cloud database associated with the particular driver.

4. The computer-implemented method of claim 1, wherein receiving the vehicle identification data identifying the vehicle other than the particular vehicle comprises one of:

obtaining the vehicle identification data received by a portable electronic device from the particular driver identified by the driver identification data; and obtaining the vehicle identification data received by a portable electronic device from the vehicle other than the particular vehicle.

5. The computer-implemented method of claim 1, wherein determining, by the one or more processors, the driver vehicle setting data particular to the vehicle other than the particular vehicle based on the abstract driver vehicle setting data comprises:

obtaining a likely profile of the particular driver from the abstract driver vehicle setting data, the likely profile of the particular driver comprising data that indicates at least a likely height, a likely arm length, and a likely leg length of the particular driver;

determining a range of values for each of one or more vehicle settings in the vehicle other than the particular vehicle; and determining, for each of the one or more vehicle settings in the vehicle other than the particular vehicle, a particular value within the range of values that corresponds to the likely profile of the particular driver.

6. The computer-implemented method of claim 1, wherein triggering the application of the driver vehicle setting data particular to the vehicle comprises:

transmitting, to the vehicle, the driver vehicle setting data particular to the vehicle, wherein the driver vehicle setting data particular to the vehicle is applied by the vehicle to configure settings in the vehicle to the driver vehicle settings.

7. A system comprising:

one or more computers and one or more storage devices storing instructions that are operable, when executed by the one or more computers, to cause the one or more computers to perform operations comprising:

receiving driver identification data identifying a particular driver;

obtaining abstract driver vehicle setting data based on the driver identification data, wherein the abstract driver vehicle setting data (i) includes vehicle component settings configurable for a plurality of vehicles and (ii) is generated based on the vehicle setting data obtained from a particular vehicle associated with the particular driver;

receiving vehicle identification data identifying a vehicle other than the particular vehicle;

determining driver vehicle setting data particular to the vehicle other than the particular vehicle based on the abstract driver vehicle setting data; and triggering an application of the driver vehicle setting data particular to the vehicle other than the particular vehicle to modify one or more physical settings of one or more vehicle components in the vehicle other than the particular vehicle.

8. The system of claim 7, wherein the driver vehicle setting data particular to the vehicle comprise data indicative of one or more of mirror positions, a driver seat position, steering wheel position, foot pedal positions, radio station presets, heating, ventilation, air conditioning (HVAC) settings, vehicle lighting preferences, wiper speed settings, navigation settings, camera bumper settings, safety alert settings, child lock settings, and window lock settings.

9. The system of claim 7, wherein the operations further comprise:

determining that the received driver identification data corresponds to a driver identification of the particular driver stored in an Internet cloud database associated with the particular driver.

10. The system of claim 7, wherein receiving the vehicle identification data identifying the vehicle other than the particular vehicle comprises one of:

obtaining the vehicle identification data received by a portable electronic device from the particular driver identified by the driver identification data; and obtaining the vehicle identification data received by a portable electronic device from the vehicle other than the particular vehicle.

11. The system of claim 7, wherein determining, by the one or more processors, the driver vehicle setting data particular to the vehicle other than the particular vehicle based on the abstract driver vehicle setting data comprises:

obtaining a likely profile of the particular driver from the abstract driver vehicle setting data, the likely profile of the particular driver comprising data that indicates at least a likely height, a likely arm length, and a likely leg length of the particular driver;

determining a range of values for each of one or more vehicle settings in the vehicle other than the particular vehicle; and determining, for each of the one or more vehicle settings in the vehicle other than the particular vehicle, a particular value within the range of values that corresponds to the likely profile of the particular driver.

12. The system of claim 7, wherein triggering the application of the driver vehicle setting data particular to the vehicle other than the particular vehicle comprises:

transmitting, to the vehicle other than the particular vehicle, the driver vehicle setting data particular to the vehicle other than the particular vehicle, wherein the driver vehicle setting data particular to the vehicle other than the particular vehicle is applied by the vehicle other than the particular vehicle to configure settings in the vehicle other than the particular vehicle to the driver vehicle settings.

13. The system of claim 7, wherein obtaining the abstract driver vehicle setting data based on the driver identification data comprises:
   obtaining the vehicle setting data from the particular vehicle;
   determining a likely physical profile of the particular driver; and
   transforming the vehicle setting data from the particular vehicle to the abstract driver vehicle setting data using the likely physical profile of the particular driver.

14. A non-transitory computer-readable medium storing instructions executable by one or more computers which, upon such execution, cause the one or more computers to perform operations comprising:
   receiving driver identification data identifying a particular driver;
   obtaining abstract driver vehicle setting data based on the driver identification data, wherein the abstract driver vehicle setting data (i) includes vehicle component settings configurable for a plurality of vehicles and (ii) is generated based on the vehicle setting data obtained from a particular vehicle associated with the particular driver;
   receiving vehicle identification data identifying a vehicle other than the particular vehicle;
   determining driver vehicle setting data particular to the vehicle other than the particular vehicle based on the abstract driver vehicle setting data; and
   triggering an application of the driver vehicle setting data particular to the vehicle other than the particular vehicle to modify one or more physical settings of one or more vehicle components in the vehicle other than the particular vehicle.

15. The non-transitory computer-readable medium of claim 14, wherein the driver vehicle setting data particular to the vehicle comprise data indicative of one or more of mirror positions, a driver seat position, steering wheel position, foot pedal positions, radio station presets, heating, ventilation, air conditioning (HVAC) settings, vehicle lighting preferences, wiper speed settings, navigation settings, camera bumper settings, safety alert settings, child lock settings, and window lock settings.

16. The non-transitory computer-readable medium of claim 14, wherein the operations further comprise:
   determining that the received driver identification data corresponds to a driver identification of the particular driver stored in an Internet cloud database associated with the particular driver.

17. The non-transitory computer-readable medium of claim 14, wherein receiving the vehicle identification data identifying the vehicle other than the particular vehicle comprises one of:
   obtaining the vehicle identification data received by a portable electronic device from the particular driver identified by the driver identification data; and
   obtaining the vehicle identification data received by a portable electronic device from the vehicle other than the particular vehicle.

18. The non-transitory computer-readable medium of claim 14, wherein determining, by the one or more processors, the driver vehicle setting data particular to the vehicle other than the particular vehicle based on the abstract driver vehicle setting data comprises:
   obtaining a likely profile of the particular driver from the abstract driver vehicle setting data, the likely profile of the particular driver comprising data that indicates at least a likely height, a likely arm length, and a likely leg length of the particular driver;
   determining a range of values for each of one or more vehicle settings in the vehicle other than the particular vehicle; and
   determining, for each of the one or more vehicle settings in the vehicle other than the particular vehicle, a particular value within the range of values that corresponds to the likely profile of the particular driver.

19. The non-transitory computer-readable medium of claim 14, triggering the application of the driver vehicle setting data particular to the vehicle other than the particular vehicle comprises:
   transmitting, to the vehicle other than the particular vehicle, the driver vehicle setting data particular to the vehicle other than the particular vehicle,
   wherein the driver vehicle setting data particular to the vehicle other than the particular vehicle is applied by the vehicle other than the particular vehicle to configure settings in the vehicle other than the particular vehicle to the driver vehicle settings.

20. The non-transitory computer-readable medium of claim 14, wherein obtaining the abstract driver vehicle setting data based on the driver identification data comprises:
   obtaining the vehicle setting data from the particular vehicle;
   determining a likely physical profile of the particular driver; and
   transforming the vehicle setting data from the particular vehicle to the abstract driver vehicle setting data using the likely physical profile of the particular driver.

* * * * *

UNITED STATES PATENT AND TRADEMARK OFFICE
CERTIFICATE OF CORRECTION

| | | |
|---|---|---|
| PATENT NO. | : 10,017,139 B2 | Page 1 of 1 |
| APPLICATION NO. | : 15/042589 | |
| DATED | : July 10, 2018 | |
| INVENTOR(S) | : Brenner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 193 days.

Signed and Sealed this
Eighteenth Day of December, 2018

Andrei Iancu
*Director of the United States Patent and Trademark Office*